United States Patent
Oh et al.

(10) Patent No.: US 7,907,851 B2
(45) Date of Patent: Mar. 15, 2011

(54) SELF-OSCILLATION COMMUNICATION MODULE

(75) Inventors: Dae-Kon Oh, Daejeon (KR); Jin-Hong Lee, Daejeon (KR); Jin-Soo Kim, Daejeon (KR); Sung-Ui Hong, Daejeon (KR); Byung-Seok Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 813 days.

(21) Appl. No.: 11/720,933

(22) PCT Filed: Dec. 7, 2005

(86) PCT No.: PCT/KR2005/004167
§ 371 (c)(1),
(2), (4) Date: Oct. 10, 2007

(87) PCT Pub. No.: WO2006/062344
PCT Pub. Date: Jun. 15, 2006

(65) Prior Publication Data
US 2009/0223565 A1 Sep. 10, 2009

(30) Foreign Application Priority Data

Dec. 8, 2004 (KR) .................. 10-2004-0103069
Jun. 28, 2005 (KR) .................. 10-2005-0056053

(51) Int. Cl.
*H04B 10/00* (2006.01)

(52) U.S. Cl. ................... 398/164; 398/117; 398/116

(58) Field of Classification Search .......... 398/164, 398/165, 141, 139, 134, 117, 116, 115, 171; 136/262; 372/44.01; 257/E29.071, E31.004
See application file for complete search history.

(56) References Cited

U.S. PATENT DOCUMENTS

| 5,715,339 A * | 2/1998 | Takai et al. ............ 385/24 |
| 2004/0190330 A1* | 9/2004 | Iwata ................... 365/149 |
| 2005/0019037 A1* | 1/2005 | Luo et al. .............. 398/164 |

FOREIGN PATENT DOCUMENTS

| JP | 55-006925 | * | 1/1980 |
| JP | 58-176792 | * | 10/1983 |
| JP | 04-331515 | | 11/1992 |
| JP | 2003-018072 | | 1/2003 |
| KR | 10-2002-0093269 A | | 12/2002 |
| KR | 10-2004-0014049 A | | 2/2004 |

* cited by examiner

*Primary Examiner* — M. R. Sedighian (57) ABSTRACT

Provided is a self-oscillation communication module in which an optical device, a solar battery, and a radio frequency (RF) device are monolithic-integrated. When an active layer of the optical device contains In(Ga)As quantum dots, the optical device can emit light ranging from 800 to 1600 nm and transmit signals at a high speed of 20 Gbps or higher. Since a light absorption layer of the solar battery is formed of InGa (Al)P which has a higher bandgap than silicon and high visible light absorptivity, the solar battery can generate a large current even with a very small light reception area. Therefore, the self-oscillation communication module can always operate using the solar battery without an external power source even in polar regions and deserts and can perform optical communication or high-frequency wireless communication with a wide frequency range.

13 Claims, 5 Drawing Sheets

SELF-OSCILLATION COMMUNICATION MODULE

TECHNICAL FIELD

The present invention relates to a communication module, and more particularly, to a self-oscillation communication module

BACKGROUND ART

In recent years, mobile communications have made startling progress along with a remarkable development in the information industry. This will lead to the introduction of a ubiquitous sensor network that allows a user to communicate whenever, wherever, and whatever to whomever he or she likes. In order to embody such a ubiquitous sensor network, a large quantity of communication devices is installed on the surface of the earth or moves around to perform a communication function. The communication device should always be driven without an external wire power source or disposable battery, regardless of where it is.

In particular, a mobile communication device can make use of a solar battery as an energy source. A silicon-based solar battery is the most popular conventional solar battery. The silicon-based solar battery has a photoelectric conversion efficiency of less than 10% and a silicon material has a low bandgap of about 1.1 eV. For these reasons, several batteries should be connected in parallel to obtain an optimum voltage. Accordingly, it is difficult to apply the silicon-based solar battery to the communication device. To solve this problem, a solar battery using a compound semiconductor has been proposed.

DISCLOSURE OF INVENTION

Technical Problem

A solar battery using the compound semiconductor has a photoelectric conversion efficiency of less than 24%, which is higher than that of a silicon-based solar battery. However, because of several technical restrictions, a solar battery using a compound semiconductor has not yet been applied to communication devices, let alone optical communication or wireless communication. Solar batteries are used for illumination devices, however.

Technical Solution

According to an aspect of the present invention, there is provided a self-oscillation communication module including a signal processor. The signal processor may be disposed in a silicon substrate. A self-oscillation communication device is bonded to the signal processor. An optical device which transmits or receives light, a solar battery which operates using only solar energy, and an RF (radio frequency) device which enables high-frequency wireless communication, are monolithically integrated in the self-oscillation communication device.

The optical device, the solar battery, and the RF device may be sequentially stacked. Alternatively, the solar battery, the optical device, and the RF device may be sequentially stacked. The optical device may be a laser diode (LD) including an active layer containing quantum dots or a photodiode (PD).

In one embodiment, the self-oscillation communication device may further include a GaAs substrate of a first conductivity type including the RF device. The solar battery may include a semiconductor layer of the first conductivity type, an InGa(Al)P light absorption layer, and a semiconductor layer of a second conductivity type opposite to the first conductivity type stacked sequentially on the GaAs substrate of the first conductivity type. The optical device may include a lower clad layer of the second conductivity type, an In(Ga)As quantum dot active layer, and an upper clad layer of the first conductivity type stacked sequentially on the solar battery. Also, when the solar battery receives solar light, a forward voltage may be applied to the optical device so that current can flow through the optical device.

In another embodiment, the self-oscillation communication device may further include a GaAs substrate of a first conductivity type including the RF device. The optical device may include a lower clad layer of the first conductivity type, an In(Ga)As quantum dot active layer, and an upper clad layer of a second conductivity type opposite to the first conductivity type stacked sequentially stacked on the GaAs substrate of the first conductivity type. The solar battery may include a semiconductor layer of the second conductivity type, an InGa(Al)P light absorption layer, and a semiconductor layer of the first conductivity type stacked sequentially on the optical device. Also, when the solar battery receives solar light, a forward voltage may be applied to the optical device so that current can flow through the optical device.

An optical fiber may be connected to the optical device of the self-oscillation communication device for optical communication. The optical fiber may be disposed in a V-shaped groove made in the silicon substrate and connected to the optical device.

ADVANTAGEOUS EFFECTS

The present invention provides a self-oscillation communication module, which can self-oscillate using a highly efficient solar battery and enables both optical communication and high-frequency (HF) wireless communication.

DESCRIPTION OF DRAWINGS

The above and other features and advantages of the present invention will become more apparent by describing in detail exemplary embodiments thereof with reference to the attached drawings in which.

BEST MODE

The present invention will now be described more fully hereinafter with reference to the accompanying drawings, in which exemplary embodiments of the invention are shown. This invention may, however, be embodied in different forms and should not be construed as limited to the embodiments set forth herein. Rather, these embodiments are provided so that this disclosure is thorough and complete and fully conveys the scope of the invention to those skilled in the art. In the drawings, the thickness of layers and regions are exaggerated for clarity. In the present specification, a material put in parentheses '( )' may or may not be included. For example, an In(Ga)As layer may be an InAs layer or an InGaAs layer.

Embodiment 1

Figure 1:
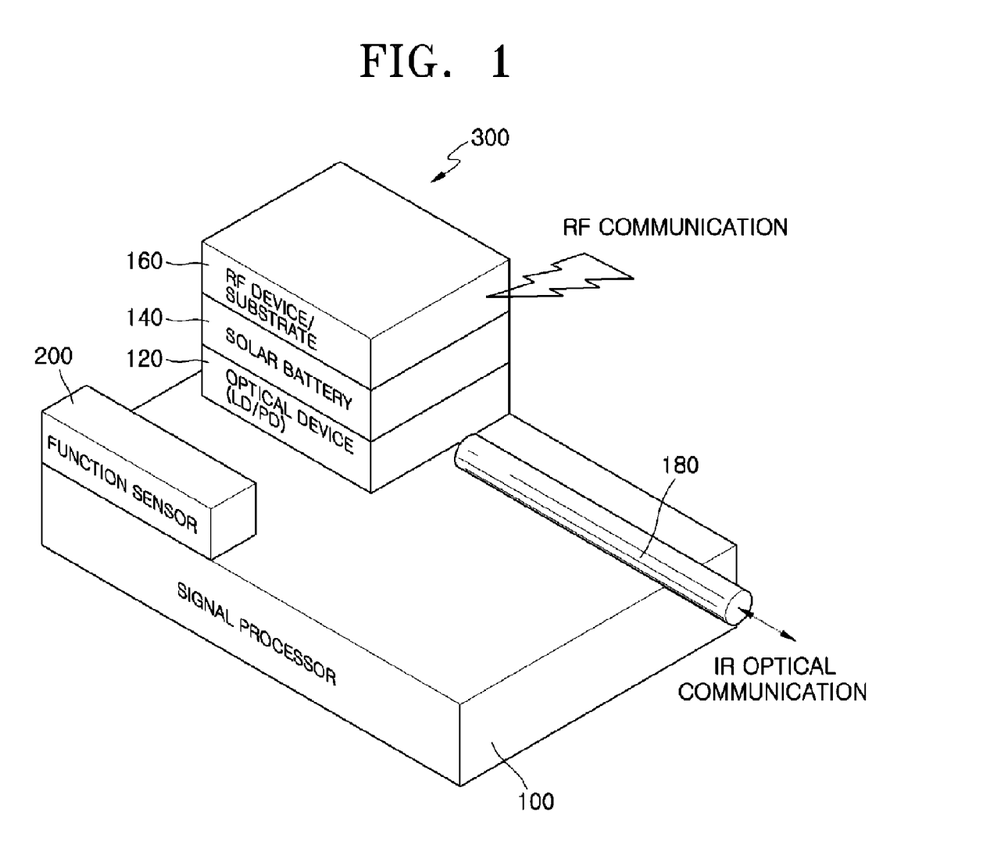
FIGS. 1 and 2 are a perspective view and cross sectional view, respectively, of a self-oscillation communication module according to an exemplary embodiment of the present invention.
Figure 2:
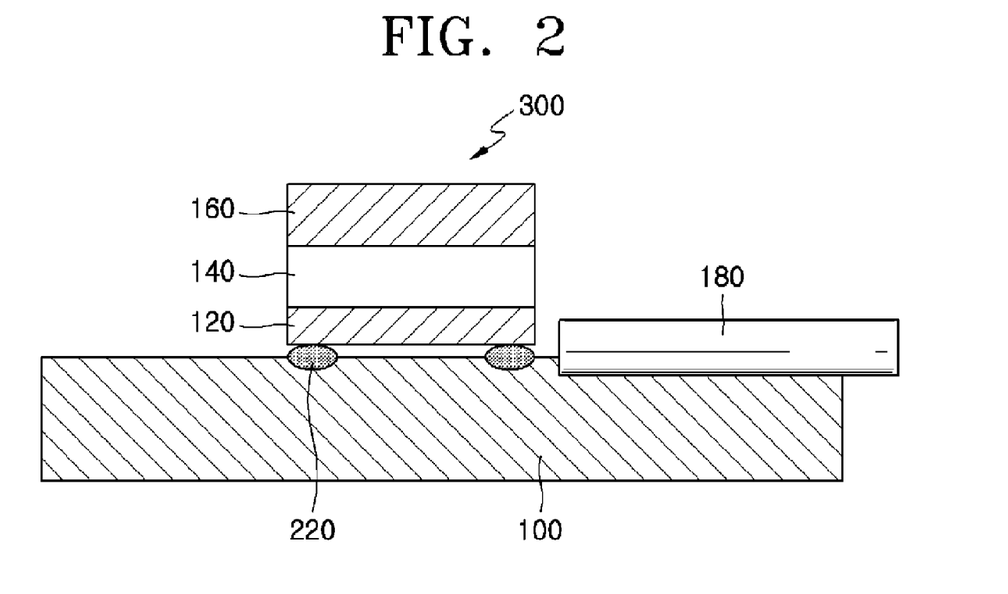

FIGS. 1 and 2 are a perspective view and cross sectional view, respectively, of a self-oscillation communication module according to an exemplary embodiment of the present invention.

The self-oscillation communication module of the present embodiment includes a self-oscillation communication device 300, which is bonded to a signal processor 100 by a bonding member 220. The signal processor 100 is disposed in a silicon substrate and includes various circuits, capacitors, and resistors. It will be apparent to those skilled in the art that the various circuits, capacitors, and resistors may be installed outside the signal processor 100, not inside the signal processor 100. A function sensor 200 may be further integrated with the signal processor 100. The function sensor 200 may have various functions, for example, gas detection, optical detection, and electrical detection. The signals of the function sensor 200 are processed in the signal processor 100. Of course, other various elements may be further integrated with the signal processor 100.

In the self-oscillation communication device 300, an optical device 120, a solar battery 140, and a radio-frequency (RF) device 160 are monolithically integrated. The optical device 120 receives or transmits light, the solar battery 140 can operate using only solar energy (solar light), and the RF device 160 enables HF wireless communication. The self-oscillation communication device 300 of the present embodiment adopts a GaAs substrate for monolithic integration as will be described later.

The optical device 120 includes a laser diode (LD), which emits light, or a photodiode (PD), which receives light. The LD of the optical device 120 includes an active layer with quantum dots, for example, an In(Ga)As layer. When the active layer of the LD has the quantum dots, the LD can emit light ranging from 800 to 1600 nm and transmit signals at a high speed of 20 Gbps or higher.

An optical fiber 180 is connected to the optical device 120 of the self-oscillation communication device 300 for optical communication, for example, infrared (IR) optical communication. The optical fiber 180 is disposed in a V-shaped groove made in the silicon substrate in which the signal processor 100 is disposed so that the optical fiber 180 is connected to the optical device 120. The RF device 160 can receive or send HF radio waves.

The self-oscillation communication device 300 includes the solar battery 140. The solar battery 140 includes as a light absorption layer an InGa(Al)P material layer, which has a higher bandgap than silicon and high visible light absorptivity, as will be described later. When solar light is incident on the solar battery 140, the solar battery 140 generates current. Thus, the LD of the optical device 120 emits light which is transmitted through the optical fiber 180. Also, the current generated by the solar battery 140 on which the solar light is incident is used as a power source of the RF device 160 or the optical device 120. The light traveling from the optical fiber 180 to the optical device 120 is converted into an electric signal by the PD of the optical device 120 and processed by the signal processor 100. An electric signal received from the RF device 160 is also processed by the signal processor 100.

As described above, the self-oscillation communication device 300 of the present embodiment includes the optical device 120 having the LD or PD, the solar battery 140, and the RF device 160, which are monolithically integrated with the signal processor 100. In particular, since the self-oscillation communication device 300 of the present embodiment includes the solar battery 140, it can self-oscillate without a wire power source or disposable battery and perform optical communication or HF wireless communication.

Figure 3:
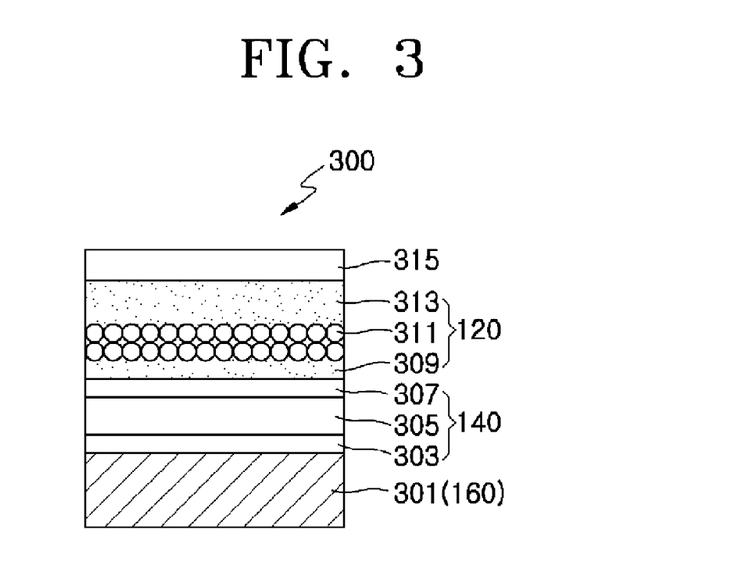
FIG. 3 is a cross sectional view of a self-oscillation communication device of FIG. 1.

FIG. 3 is a cross sectional view of the self-oscillation communication device 300 of FIG. 1.

The self-oscillation communication device 300 of FIG. 1 includes a GaAs substrate 301 of a first conductivity type (e.g., an n type or p type) including the RF device 160. The RF device 160 is not illustrated in FIG. 3 for convenience. The solar battery 140 is disposed on the GaAs substrate 301 of the first conductivity type. The solar battery 140 includes a semiconductor layer 303 of the first conductivity type, an InGa(Al)P light absorption layer 305, and a semiconductor layer 307 of a second conductivity type (e.g., a p type or n type) opposite to the first conductivity type, stacked sequentially. The optical device 120 is disposed on the solar battery 140. The optical device 120 includes a lower clad layer 309 of the second conductivity type, an In(Ga)As quantum dot active layer 311, and an upper clad layer 313 of the first conductivity type. When the self-oscillation communication device 300 of FIG. 3 is bonded to the signal processor 100 of FIG. 1, the self-oscillation communication device 300 is turned upside down and bonded to the signal processor 100 through a flip-chip bonding (FCB) process using the bonding member (220 of FIG. 2).

The structure and function of the self-oscillation communication device 300 of FIG. 1 according to an embodiment of the present invention will now be described in more detail. In the self-oscillation communication device 300, the solar battery 140 including an n-GaAs buffer layer 303, an InGa(Al)P light absorption layer 305, and a p-GaAs junction layer 307 stacked sequentially, which is an np-type solar battery, is disposed on an n-GaAs substrate 301. In other words, the solar battery 140 is an np-type hetero-junction layer. Since the InGa(Al)P light absorption layer 305 has a higher bandgap than silicon and high visible light absorptivity, it can generate a large current even with a very small light reception area.

The optical device 120 including a p-AlGaAs lower clad layer 309, an In(Ga)As quantum dot active layer 311, and an n-AlGaAs upper clad layer 313 stacked sequentially, which is a pn-type optical device, is disposed on the p-GaAs junction layer 307. In other words, the optical device 120 is a pn-type hetero-junction layer. An n-GaAs cap layer 315 is disposed on the n-AlGaAs upper clad layer 313.

When the active layer 311 of the optical device 120 has In(Ga)As quantum dots, the active device 120 can emit light ranging from 800 to 1600 nm and transmit signals at a high speed of 20 Gbps or higher. Although it is illustrated in FIG. 3 that the optical device 120 is an LD including the In(Ga)As quantum dot active layer 311, the optical device 120 may be an PD without the In(Ga)As quantum dot active layer 311.

When the solar battery 140 receives solar light, the solar light is absorbed by the solar battery 140, and holes and electrons are generated from the energy of the absorbed solar light and freely move in the solar battery 140. The electrons move toward the n-GaAs buffer layer (i.e., the n-type semiconductor layer) 303 and the holes move the p-GaAs junction layer (i.e., the p-type semiconductor layer) 307, and a potential difference is generated. Accordingly, when the n-GaAs buffer layer 303 is electrically connected to the p-GaAs junction layer 307, current flows. The p-GaAs junction layer 307 and the n-GaAs buffer layer 303 correspond to an anode and a cathode, respectively.

Furthermore, by electrically connecting the n-GaAs buffer layer 303 to the n-GaAs cap layer 315, a forward voltage is automatically applied to the optical device 120 so that current flows through the optical device 120. As a result, the solar battery 140 functions as a power source of the optical device 120. Of course, the solar battery 140 also functions as a power source of the RF device 160 when the solar battery 140 is electrically connected to the n-GaAs substrate 301 including the RF device 160.

Although it is described above that the self-oscillation communication device 300 is disposed on the n-GaAs substrate 301, the self-oscillation communication device 300 may be disposed on a p-GaAs substrate 301. When the self-oscillation communication device 300 is formed on the p-GaAs substrate 301, the self-oscillation communication device 300 includes a pn-type solar battery 140 and an np-type optical device 120. The pn-type solar battery 140 includes a p-GaAs buffer layer 303, an InGa(Al)P light absorption layer 305, and an n-GaAs junction layer 307, which are sequentially stacked on the p-GaAs substrate 301. The np-type optical device 120 includes an n-AlGaAs lower clad layer 309, an In(Ga)As quantum dot active layer 311, and a p-AlGaAs upper clad layer 313, which are sequentially stacked on the n-GaAs junction layer 307. In this case, since the only conductivity type is reversed, the self-oscillation communication device 300 can perform the same operations as described above.

MODE FOR INVENTION

Embodiment 2

Figure 4:
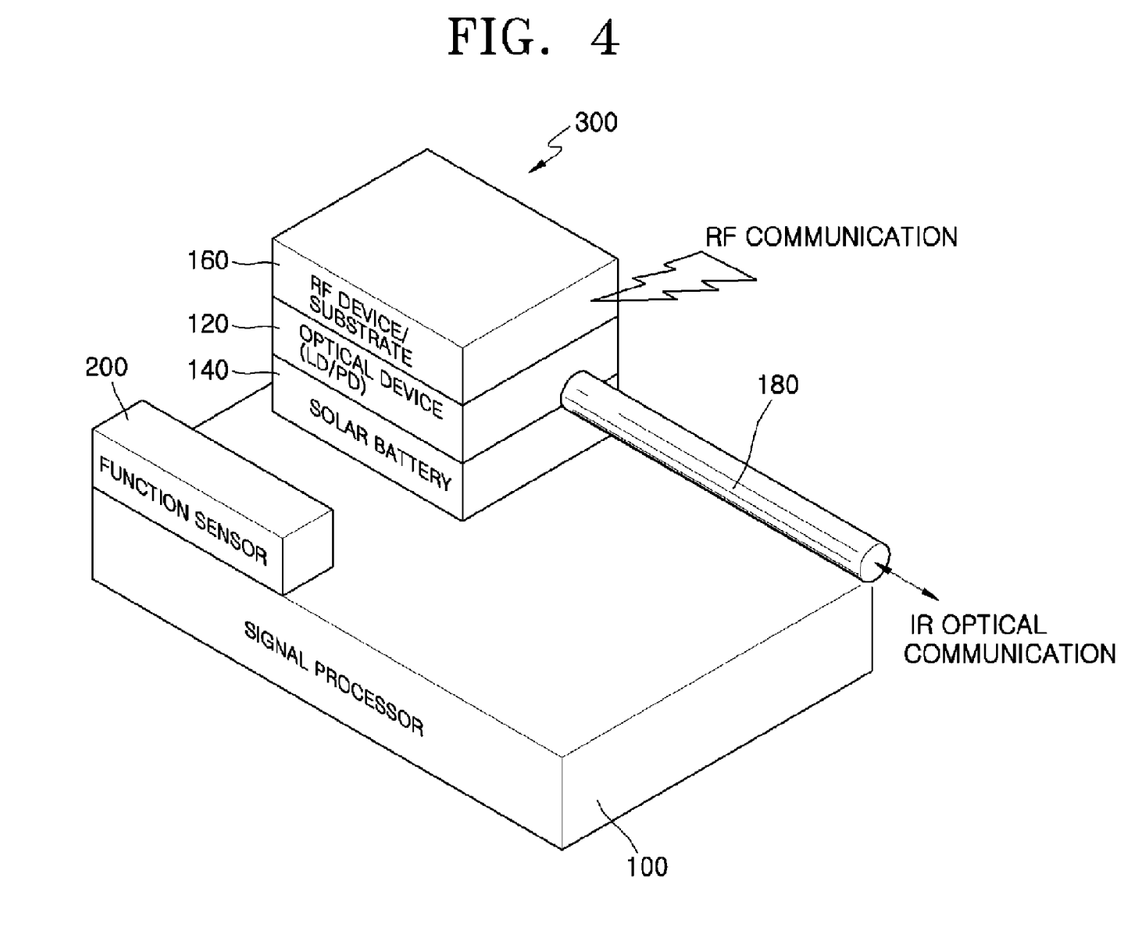
FIGS. 4 and 5 are a perspective view and cross sectional view, respectively, of a self-oscillation communication module according to another exemplary embodiment of the present invention.
Figure 5:
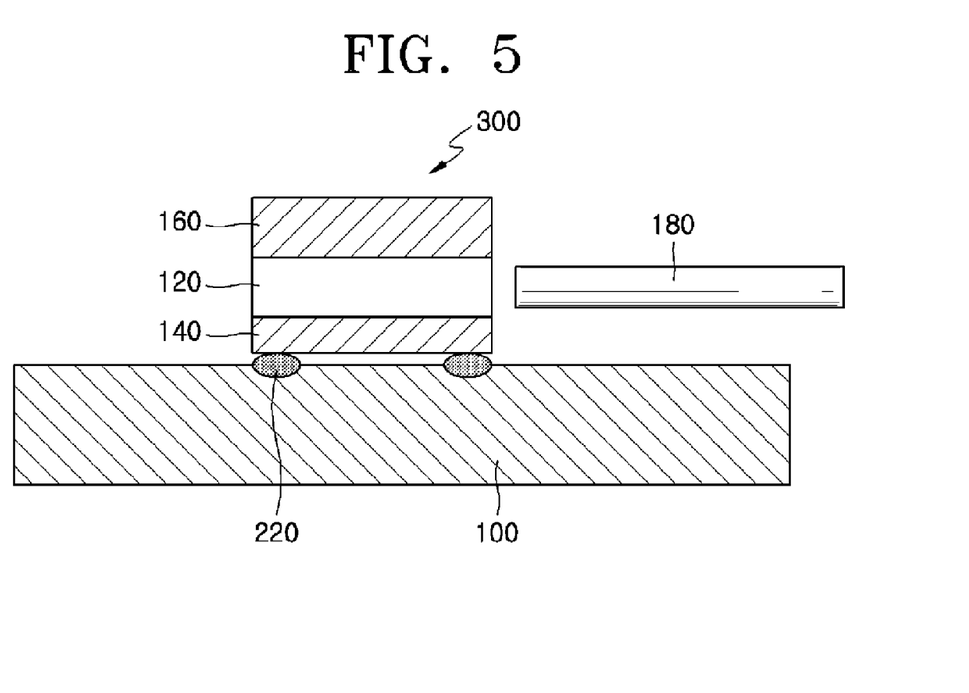

FIGS. 4 and 5 are a perspective view and cross sectional view, respectively, of a self-oscillation communication module according to another exemplary embodiment of the present invention.

The self-oscillation communication module of the present embodiment is the same as that of Embodiment 1 except that a solar battery 140 is integrated with a signal processor 100. In FIGS. 4 and 5, the same reference numerals are used to denote the same elements as in FIGS. 1 and 2.

The self-oscillation communication module of the present embodiment includes a self-oscillation communication device 300, which is bonded to a signal processor 100 by a bonding member 220. The signal processor 100 is disposed in a silicon substrate and includes various circuits and capacitors. A solar battery 140, an optical device 120, and an RF device 160 are monolithically integrated in the self-oscillation communication device 300. The solar battery 140 can operate using only solar energy (solar light), the optical device 120 receives or transmits light, and the RF device 160 enables HF wireless communication.

The optical device 120 includes an LD, which emits light, or a PD, which receives light. The LD of the optical device 120 includes an active layer with quantum dots. When the active layer of the LD has the quantum dots, the LD can emit light ranging from 800 to 1600 nm and transmit signals at a high speed of 20 Gbps or higher. An optical fiber 180 is connected to the optical device 120 of the self-oscillation communication device 300 for optical communication, for example, IR optical communication. The RF device 160 can receive or send HF radio waves.

As described above, the self-oscillation communication device 300 of the present embodiment includes the solar battery 140, the optical device 120 having the LD or PD, and the RF device 160, which are monolithically integrated with the signal processor 100. Accordingly, the self-oscillation communication device 300 can self-oscillate without a wire power source or disposable battery and perform optical communication or HF wireless communication.

Figure 6:
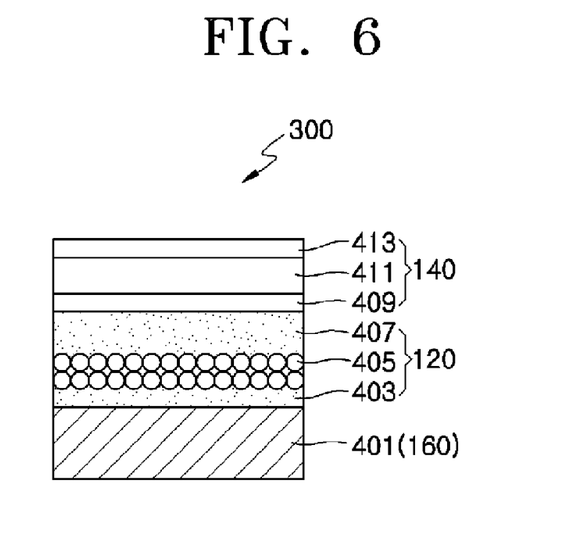
FIG. 6 is a cross sectional view of a self-oscillation communication device of FIG. 4.

FIG. 6 is a cross sectional view of the self-oscillation communication device 300 of FIG. 4.

The self-oscillation communication device 300 of FIG. 4 includes a GaAs substrate 401 of a first conductivity type (e.g., an n type or p type), the optical device 120, and the solar battery 140. The GaAs substrate 401 includes the RF device 160. The optical device 120 includes a lower clad layer 403 of the first conductivity type, an In(Ga)As quantum dot active layer 405, and an upper clad layer 407 of a second conductivity type (e.g., a p type or n type) opposite to the first conductivity type, stacked sequentially on the GaAs substrate 401 of the first conductivity type. The solar battery 140 includes a semiconductor layer 409 of the second conductivity type, an InGa(Al)P light absorption layer 411, and a semiconductor layer 413 of the first conductivity type, stacked sequentially on the optical device 120. When the self-oscillation communication device 300 of FIG. 6 is bonded to the signal processor 100 of FIG. 4, the self-oscillation communication device 300 is turned upside down and bonded to the signal processor 100 through an FCB process using the bonding member (220 of FIG. 5).

The structure and function of the self-oscillation communication device 300 of FIG. 3 according to an embodiment of the present invention will now be described in more detail. In the self-oscillation communication device 300, the optical device 120 including an n-AlGaAs lower clad layer 403, an In(Ga)As quantum dot active layer 405, and a p-AlGaAs upper clad layer 407 stacked sequentially, which is an np-type optical device, is disposed on the n-GaAs substrate 401 including the RF device 160. An n-GaAs buffer layer (not shown) may be additionally disposed on the n-GaAs substrate 401. The optical device 120 is formed of np-type heterojunction layers. Although it is illustrated in FIG. 6 that the optical device 120 is an LD including the In(Ga)As quantum dot active layer 405, the optical device 120 may be a PD without the In(Ga)As quantum dot active layer 405.

The solar battery 140 including a p-GaAs junction layer 409, an InGa(Al)P light absorption layer 411, and an n-GaAs cap layer 413 stacked sequentially, which is a pn-type solar battery, is disposed on the p-AlGaAs upper clad layer 407 of the optical device 120. In other words, the solar battery 140 is formed of pn-type hetero-junction layers.

As described above, when the solar battery 140 receives solar light and the n-GaAs cap layer 413 is electrically connected to the p-GaAs junction layer 409, current flows, and the p-GaAs junction layer 409 and the n-GaAs cap layer 413 correspond to an anode and a cathode, respectively.

Furthermore, by electrically connecting the n-GaAs cap layer 413 to the n-GaAs substrate 401, a forward voltage is automatically applied to the optical device 120 so that current flows through the optical device 120. As a result, the solar battery 140 functions as a power source of the optical device 120. Of course, the solar battery 140 also functions as a power source of the RF device 160 when the solar battery 140 is electrically connected to the n-GaAs substrate 401 including the RF device 160.

Although it is described above that the self-oscillation communication device 300 is disposed on the n-GaAs substrate 401, the self-oscillation communication device 300 may be disposed on a p-GaAs substrate 401. When the self-oscillation communication device 300 is formed on the p-GaAs substrate 401, the self-oscillation communication device 300 includes a pn-type optical device 120 and an np-type solar battery 140. The pn-type optical device 120 includes a p-AlGaAs lower clad layer 403, an In(Ga)As quantum dot active layer 405, and an n-AlGaAs upper clad layer 407, which are sequentially stacked on the p-GaAs substrate 401. The np-type solar battery 140 includes an n-GaAs junction layer 409, an InGa(Al)P light absorption layer 411, and a p-GaAs cap layer 413, which are sequentially stacked on the n-AlGaAs upper clad layer 407. In this case, sine only the conductivity type is reversed, the self-oscillation communication device 300 can perform the same operations as described above.

Figure 7:
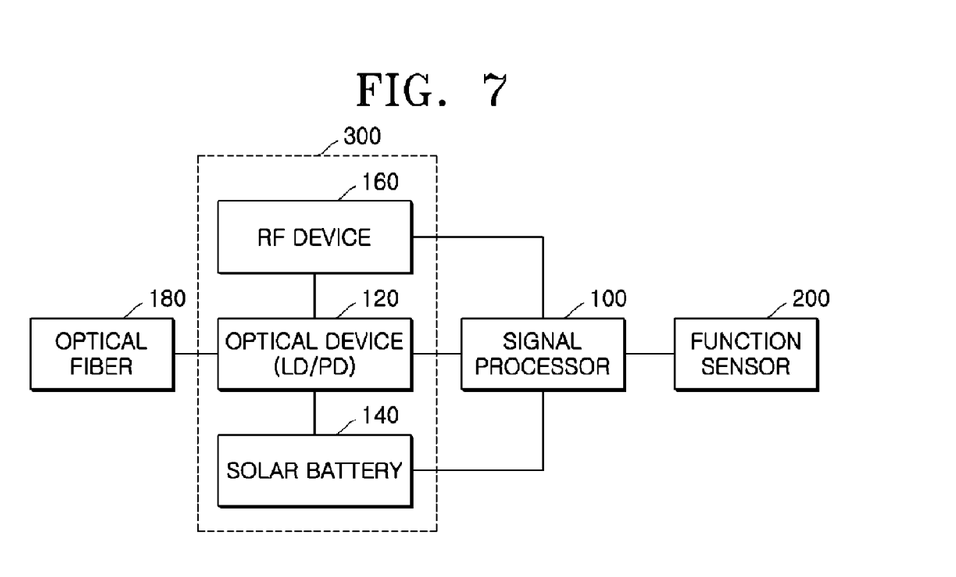
FIG. 7 is a block diagram of a self-oscillation communication module according to an exemplary embodiment of the present invention.

FIG. 7 is a block diagram of a self-oscillation communication module according to an exemplary embodiment of the present invention.

As explained above, the self-oscillation communication module according to an embodiment of the present invention includes a self-oscillation communication device 300. The self-oscillation communication device 300 includes an optical device 120, which can transmit or receive light, a solar battery 140, which can operate using only solar energy (solar light), and an RF device 160, which enables HF wireless communication.

The optical device 120 includes an LD, which emits light, or a PD, which receives light. The LD of the optical device 120 has an active layer with quantum dots. When the active layer of the LD has the quantum dots, the LD can emit light with a wide wavelength range of 800 to 1600 nm and transmit signals at a high speed of 20 Gbps or higher.

An optical fiber 180 is connected to the optical device 120 for optical communication, for example, IR optical communication. A signal processor 100 is connected to the self-oscillation communication device 300. A function device is connected to the signal processor 100.

When the solar battery 140 of the self-oscillation communication device 300 receives solar light and generates current, light is emitted by the LD of the optical device 120 and transmitted externally through the optical fiber 180. Also, the current generated by the solar battery 140 is used as a power source of the RF device 160 or the optical device 120. The light traveling from the optical fiber 180 to the optical device 120 is converted into an electric signal by the PD of the optical device 120 and processed by the signal processor 100. An electric signal transmitted from the RF device 160 can also be processed by the signal processor 100. A function sensor 200 is connected to the signal processor 100.

Because the self-oscillation communication module of the present embodiment includes the solar battery 140, the self-oscillation communication module can self-oscillate without any wire power source or disposable battery and can perform optical communication or HF wireless communication.

Figure 8:
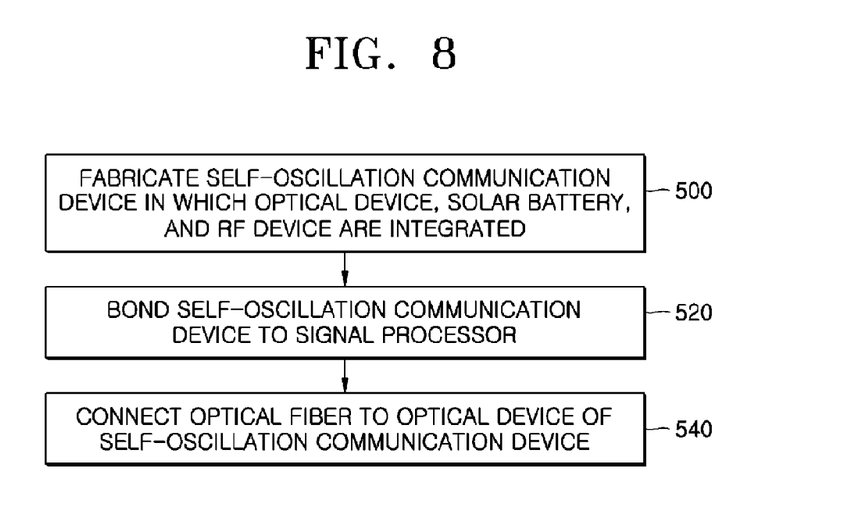
FIG. 8 is a flowchart illustrating a method of fabricating the self-oscillation communication module of FIG. 7.

FIG. 8 is a flowchart illustrating a method of fabricating the self-oscillation communication module of FIG. 7.

A self-oscillation communication device 300 in which an optical device 120, a solar battery 140, and an RF device 160 are monolithically integrated is fabricated in operation 500.

The fabrication of the self-oscillation communication device 300 will be described with reference to FIGS. 3 and 6. As can be seen from FIG. 3, the self-oscillation communication device 300 includes a GaAs substrate 301 of a first conductivity type (e.g., an n type or p type) including the RF device 160. The solar battery 140 is formed by sequentially stacking a semiconductor layer 303 of the first conductivity type, an InGa(Al)P light absorption layer 305, and a semiconductor layer 307 of a second conductivity type (e.g., a p type or n type) opposite to the first conductivity type on a GaAs substrate 301 of the first conductivity type. After that, the optical device 120 is formed by sequentially stacking a lower clad layer 309 of the second conductivity type, an In(Ga)As quantum dot active layer 311, and an upper clad layer 313 of the first conductivity type on the solar battery 140.

Alternatively, as can be seen from FIG. 6, the self-oscillation communication device 300 includes a GaAs substrate 401 of a first conductivity type (e.g., an n type or p type) including the RF device 160. The optical device 120 is formed by sequentially forming a lower clad layer 403 of the first conductivity type, an In(Ga)As quantum dot active layer 405, and an upper clad layer 407 of a second conductivity type (e.g., a p type or n type) opposite to the first conductivity type on the GaAs substrate 401 of the first conductivity type. After that, the solar battery 140 is formed by sequentially forming a semiconductor layer 409 of the second conductivity type, an InGa(Al)P light absorption layer 411, and a semiconductor layer 413 of the first conductivity type on the optical device 120.

Thereafter, the completed self-oscillation communication device 300 is turned upside down and bonded to a signal processor 100 using an FCB technique in operation 520. In operation 540, an optical fiber 180 is connected to the optical device 120 of the self-oscillation communication device 300 that is bonded to the signal processor 100 using the FCB technique. When using a silicon substrate as the signal processor 100 during the connection of the optical fiber 180, a V-shaped groove may be made in the silicon substrate so that the optical fiber 180 can be installed in the V-shaped groove and connected to the optical device 120.

As explained above, a self-oscillation communication module of the present invention includes a self-oscillation communication device in which an optical device, a solar battery, and an RF device are monolithically integrated. When the optical device is an LD and an active layer of the optical device contains In(Ga)As quantum dots, the optical device can emit light ranging from 800 to 1600 nm and transmit signals at a high speed of 20 Gbps or higher. Since a light absorption layer of the solar battery is formed of InGa(Al)P which has a higher bandgap than silicon and high visible light absorptivity, the solar battery can generate a large current even with a very small light reception area. As a consequence, the self-oscillation communication module of the present invention can always operate using the solar battery without an external power source even in polar regions and deserts and can perform optical communication or HF wireless communication with a wide frequency range.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

A self-oscillation communication module of the present invention includes a self-oscillation communication device in which an optical device, a solar battery, and an RF device are monolithically integrated. When the optical device is an LD and an active layer of the optical device contains In(Ga)As quantum dots, the optical device can emit light ranging from 800 to 1600 nm and transmit signals at a high speed of 20 Gbps or higher. Since a light absorption layer of the solar battery is formed of InGa(Al)P which has a higher bandgap than silicon and high visible light absorptivity, the solar battery can generate a large current even with a very small light reception area. As a consequence, the self-oscillation communication module of the present invention can always operate using the solar battery without an external power source even in polar regions and deserts and can perform optical communication or HF wireless communication with a wide frequency range.

The invention claimed is:

1. A self-oscillation communication module comprising:
a signal processor;
a self-oscillation communication device that is bonded to the signal processor and comprises: an optical device that transmits or receives light; a solar battery that operates using only solar energy; and an RF (radio frequency) device that enables high-frequency wireless communication, wherein the optical device, the solar battery and the RF device are monolithically integrated; and
an optical fiber connected to the optical device of the self-oscillation communication device for optical communication.

2. The module of claim 1, wherein the optical device, the solar battery, and the RF device are sequentially stacked.

3. The module of claim 1, wherein the solar battery, the optical device, and the RF device are sequentially stacked.

4. The module of claim 1, wherein the optical device is one of an LD (laser diode) including an active layer containing quantum dots and a PD (photodiode).

5. The module of claim 1, wherein the signal processor is disposed in a silicon substrate.

6. The module of claim 5, wherein the optical fiber is disposed in a V-shaped groove made in the silicon substrate and connected to the optical device.

7. A self-oscillation communication module comprising:
a signal processor;
a self-oscillation communication device that is bonded to the signal processor and comprises: an optical device that transmits or receives light; a solar battery that operates using only solar energy; and an RF (radio frequency) device that enables high-frequency wireless communication, wherein the optical device, the solar battery and the RF device are monolithically integrated; and
an optical fiber connected to the optical device of the self-oscillation communication device for optical communication,
wherein the self-oscillation communication device further comprises a GaAs substrate of a first conductivity type including the RF device,
wherein the solar battery comprises a semiconductor layer of the first conductivity type, an InGa(A1)P light absorption layer, and a semiconductor layer of a second conductivity type opposite to the first conductivity type stacked sequentially on the GaAs substrate of the first conductivity type,
wherein the optical device comprises a lower clad layer of the second conductivity type, an In(Ga)As quantum dot active layer, and an upper clad layer of the first conductivity type stacked sequentially on the solar battery, and
when the solar battery receives solar light, a forward voltage is applied to the optical device so that current flows through the optical device.

8. The module of claim 7, wherein the GaAs substrate is an n-GaAs substrate,
wherein the solar battery is an np-type solar battery comprising an n-GaAs buffer layer, the InGa(Al)P light absorption layer, and a p-GaAs junction layer stacked sequentially on the n-GaAs substrate, and
wherein the optical device is a pn-type optical device comprising a p-AlGaAs lower clad layer, an In(Ga)As quantum dot active layer, and an n-AlGaAs upper clad layer stacked sequentially on the p-GaAs junction layer.

9. The module of claim 7, wherein the GaAs substrate is a p-GaAs substrate,
wherein the solar battery is a pn-type solar battery comprising a p-GaAs buffer layer, the InGa(Al)P light absorption layer, and an n-GaAs junction layer stacked sequentially on the p-GaAs substrate, and
wherein the optical device is an np-type optical device comprising an n-AlGaAs lower clad layer, the In(Ga)As quantum dot active layer, and a p-AlGaAs upper clad layer stacked sequentially on the n-GaAs junction layer.

10. A self-oscillation communication module comprising:
a signal processor;
a self-oscillation communication device that is bonded to the signal processor and comprises: an optical device that transmits or receives light; a solar battery that operates using only solar energy; and an RF (radio frequency) device that enables high-frequency wireless communication, wherein the optical device, the solar battery and the RF device are monolithically integrated; and
an optical fiber connected to the optical device of the self-oscillation communication device for optical communication,
wherein the self-oscillation communication device further comprises a GaAs substrate of a first conductivity type including the RF device,
wherein the optical device comprises a lower clad layer of the first conductivity type, an In(Ga)As quantum dot active layer, and an upper clad layer of a second conductivity type opposite to the first conductivity type stacked sequentially on the GaAs substrate of the first conductivity type,
wherein the solar battery comprises a semiconductor layer of the second conductivity type, an InGa(Al)P light absorption layer, and a semiconductor layer of the first conductivity type stacked sequentially on the optical device, and
when the solar battery receives solar light, a forward voltage is applied to the optical device so that current flows through the optical device.

11. The module of claim 10, wherein the GaAs substrate is an n-GaAs substrate,
wherein the optical device is an np-type optical device comprising an n-GaAs buffer layer, an n-AlGaAs lower clad layer, the In(Ga)As quantum dot active layer, and a p-AlGaAs upper clad layer stacked sequentially on the n-GaAs substrate, and
wherein the solar battery is a pn-type solar battery comprising a p-GaAs junction layer, the InGa(Al)P light absorption layer, and an n-GaAs cap layer stacked sequentially on the p-AlGaAs upper clad layer.

12. The module of claim 10, wherein the GaAs substrate is a p-GaAs substrate,
wherein the optical device is a pn-type optical device comprising a p-GaAs buffer layer, a p-AlGaAs lower clad layer, the In(Ga)As quantum dot active layer, and an n-AlGaAs upper clad layer stacked sequentially on the p-GaAs substrate, and
wherein the solar battery is an np-type solar battery comprising an n-GaAs junction layer, the InGa(Al)P light absorption layer, and a p-GaAs cap layer stacked sequentially on the n-AlGaAs upper clad layer.

13. The module of claim 1, further comprising a function sensor disposed on the signal processor.

\* \* \* \* \*